Oct. 15, 1957 H. B. DEAL 2,810,093

CIRCUITRY FOR OVERCOMING RASTER BENDING

Filed March 31, 1955

INVENTOR.
HARMON B. DEAL
BY
ATTORNEY

United States Patent Office 2,810,093

Patented Oct. 15, 1957

2,810,093

CIRCUITRY FOR OVERCOMING RASTER BENDING

Harmon Bridwell Deal, Evanston, Ill., assignor to Radio Corporation of America, a corporation of Delaware Application March 31, 1955, Serial No. 498,271

The terminal fifteen years of the term of the patent to be granted has been disclaimed 8 Claims. (Cl. 315—27)

Figure 1:
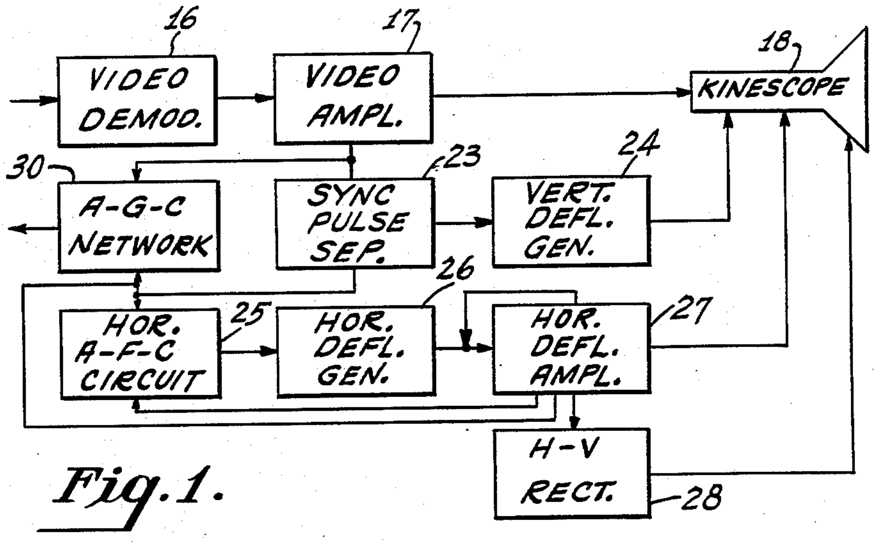

The invention relates to television receivers, and it particularly pertains to circuitry for preventing "bending" of the raster formed on the face of the kinescope.

In present day television practice, an image is formed on a fluorescent screen on the face of the kinescope by intensity modulating an electron beam scanning the screen in accordance with the image information signals. The scanning is accomplished by deflecting the electron beam in two directions normal with respect to each other to form a raster. Deflection of the electron beam is accomplished magnetically, for example, by applying a sawtooth wave of current to the deflection system windings which are mounted in a mechanical yoke arranged about the neck of the kinescope. The electron beam traverses a line of the raster as the current flow in a deflection system winding is increased and the electron beam is more rapidly returned to the beginning of the next line as the flow of current is abruptly reversed at the trailing edge of the sawtooth wave. If the beginning of each cycle of the sawtooth wave is made at precisely the same instant with reference to the time axis across the screen of the kinescope, the raster will be perfectly rectangular and each element of the image to be reproduced will appear in its proper location. If however for some reason, the beginning of each sawtooth cycle varies with respect to time, the edges of the raster will be uneven. Usually this unevenness progresses bit by bit as the individual lines are scanned so that a gentle curve is introduced at the edges of the picture and because of this curve the artisan usually refers to this distortion as "bending." Often the trouble is concentrated within a region of a few lines so that the raster appears to have a jog in it. Because the jog is due to the same underlying causes, it is still referred to as "bending."

There are several possible disturbances causing such bending. Most of these disturbances have been virtually eliminated by the use of more stable deflection wave generating circuits and automatic frequency controlling circuits for initiating and controlling the generation of the sawtooth deflection waves and the like. One particular source of such disturbance is caused by back-coupling of the deflection wave components into the deflection wave generating circuitry. Practically all conventional television receivers employ the horizontal "kick-back," "fly-back," or retrace pulse method of developing the high voltage for the ultor of the kinescope. The high amplitude and high frequency composition of this pulse makes it a potent source for back-coupling through the horizontal deflection wave amplifying tube into the horizontal deflection wave generating circuitry of the conventional television receiver. Back-coupling of this pulse into the horizontal oscillator timing circuit affects the instant of triggering of the deflection wave generator, or in some instances perhaps the variation of loading on the output circuit components of the deflecting wave translating circuitry causes distortion of the deflection wave giving rise to variation in the length of the line scanned. In either case at least one edge of the raster appears to be curved or "bent." The effect might go unnoticed if the current retrace pulse amplitude were substantially constant, since only a shift of the entire picture image would occur as a result of the variation in triggering time of the deflection wave generator or loading of the amplifier output circuitry. Retrace pulse amplitudes are not constant, however, due to the loading effect of the kinescope ultor current varying in accordance with picture detail. Because this loading follows the picture detail and is therefore unpredictable, no possibility exists of correcting the difficulty by use of higher efficiency stabilizing circuitry in the other components of the television receiver, except perhaps with an exceedingly complex and expensive arrangement.

When a bright background picture is received the ultor current increases and the retrace pulse amplitude falls, while for darker pictures the loading effect of the ultor current drops and the retrace pulse amplitude increases. For an outdoor scene showing a large portion of the sky in the background and a foreground of the usual vegetation which shows up as a dark picture detail, there will be a short sharp bend at the edge of the picture about the horizon line. With more gradual change in brightness of picture, the edges of the raster will be more gently curved.

An object of the invention is to provide simplified means for eliminating bending of the raster produced on a television kinescope.

Another object of the invention is to compensate for the loading of the deflection wave amplifying circuitry by the high voltage generating circuit.

According to the invention the bending effect caused by the variation in the retrace pulse amplitude due to picture detail is compensated for by impressing on the deflection wave generating circuit, or the input of the deflection wave amplifying circuit, a pulse having substantially the same amplitude and duration as the retrace pulse, but of opposite polarity. The opposite polarity pulse may be obtained from several points in the deflection circuitry of the conventional television receiver. In the most common application it is contemplated that this pulse will be obtained from a winding of the deflection wave output transformer. Alternatively this pulse may be obtained either by extending the existing winding in the same direction or by providing a separate winding on the same core.

Figure 2:
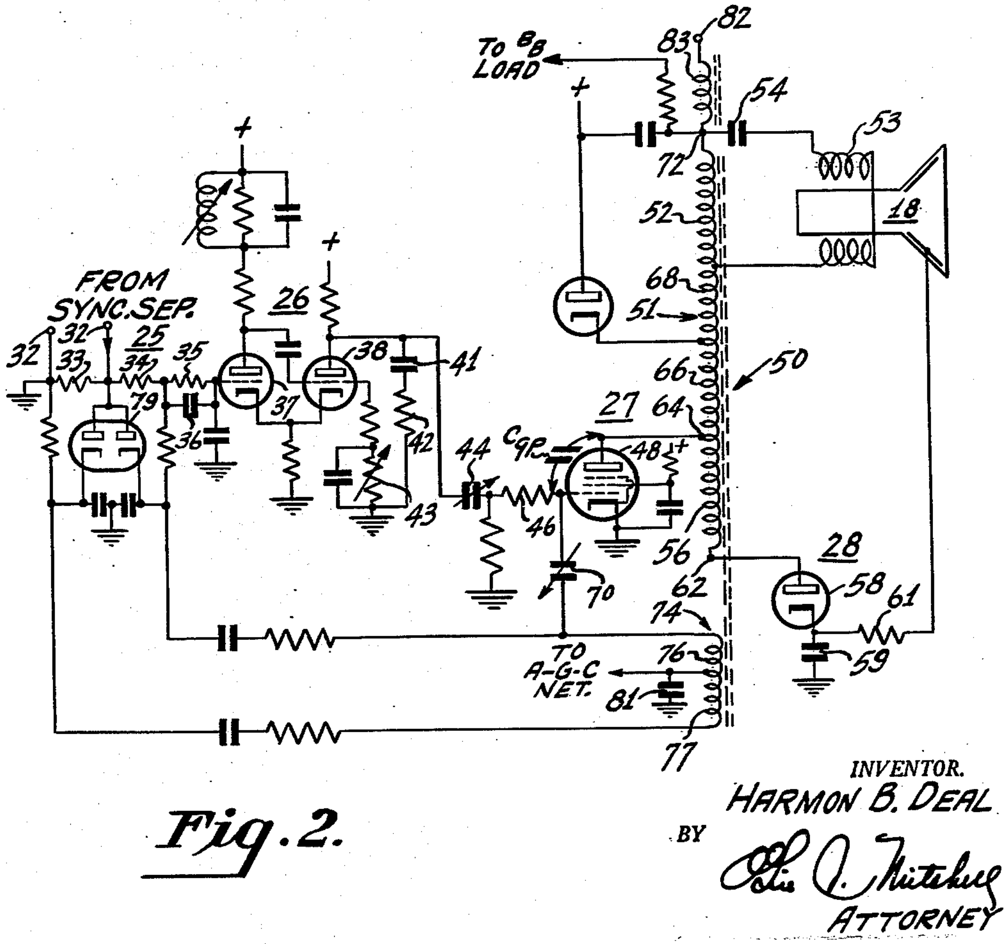

In order that the invention may be fully appreciated and readily put to practice, an express embodiment thereof is described, by way of example only, with reference to the accompanying drawing in which:

Fig. 1 is a functional diagram of a conventional television receiver to be modified in accordance with the invention; and Fig. 2 is a schematic diagram of those portions of a receiver such as outlined in Fig. 1 showing the modification according to the invention.

Referring to Fig. 1, there is shown a functional diagram of a part of a television receiver having conventional portions and other portions of predominately conventional circuitry modified according to the invention. In such a receiver television signals appearing at an antenna are applied to a radio frequency (R.-F.) amplifying circuit, and the output therefrom is applied along with a wave from a local oscillation generating circuit to a frequency converting circuit. The output of the frequency converting circuit is applied to an intermediate frequency (I.-F.) amplifying circuit which may be an individual picture, I.-F. amplifying circuit or one amplifying both picture and sound I.-F. signals. A demodulating circuit 16 is coupled to the picture I.-F. amplifying circuit for deriving the video wave from the television signals. The detected video signals are amplified in a video amplifying circuit 17 and thereafter applied to the input circuit of an image reproducing device or kinescope 18. Sound signals are derived from the frequency converting circuit, or the I.-F. amplifying circuit, or the demodulating circuit 16 for further processing in the sound I.-F. amplifying circuit, an aural signal discriminating circuit, an audio frequency amplifying circuit and a transducer, usually a speaker. The output of the video amplifying circuit 17 is also applied to a synchronizing pulse separating circuit 23 to separate the synchronizing pulses from the image information and the vertical pulses from the horizontal for application to a vertical deflection wave generating circuit 24 and through a horizontal oscillator and automatic frequency controlling (A.-F.-C.) circuit 25 to a horizontal deflection wave generator 26 and amplifying circuit 27 which is also coupled to provide reference voltage to the A.-F.-C. circuit 25. The vertical deflection generating circuit 24, the horizontal deflection wave amplifying circuit 27, and a high voltage generating circuit 28 coupled to the horizontal deflection amplifying circuit 27 are utilized to apply vertical and horizontal deflection and ultor potentials to the kinescope 18. A low voltage power supply usually in the form of a rectifier operating from the A.-C. power line is provided to supply direct energizing potential to all circuits. An A.-G.-C. amplifier and distribution network 30 is coupled to the video demodulating circuit 18 as shown or to the synchronizing pulse separating circuit 24 to supply control potential to the desired ones of the circuits previously mentioned. Usually the R.-F. and I.-F. amplifying circuits at least are so supplied. The unnumbered circuits mentioned above have been omitted in the interest of clarity and emphasis since they may be conventional in all respects.

According to the invention a correction compensating pulse obtained from the output circuitry of the horizontal amplifying circuit 27 is applied to the output of the horizontal deflection generator 26 or to the input of the horizontal deflection generator 26 or to the input of the horizontal deflection amplifying circuit 27 to compensate for the bending effect brought about by the loading of the horizontal deflection amplifier by the high voltage rectifier 28.

A schematic diagram of one example of circuitry for compensating for bending effect is shown in Fig. 2. Horizontal synchronizing pulses from the synchronizing pulse separating circuit are applied at the input terminals 32 connected across a resistor 33, which in conjunction with another resistor 34 forms the output load resistor of the automatic frequency control detector 25. The horizontal synchronizing pulses are applied by way of a grid resistor 35, shunted by a grid capacitor 36, to the grid of a generator input tube 37 which is cross-coupled to a generator output tube 38 in conventional monostable reciproconductive circuitry to constitute the horizontal deflection wave generating circuit 26. A sawtooth potential wave is developed across a capacitor 41 and a resistor 42 connected in series between the anode of the output generator tube 38 and a point of fixed potential, which is usually ground, as shown. The tube 38 is triggered to discharge the capacitor 41 at the end of each cycle of the sawtooth deflection wave in response to the applied horizontal synchronizing pulses.

The sawtooth potential wave is then applied by means of a capacitor 44 and a series resistor 46 to the control grid of an amplifier tube 48. A variable resistor 43 connected between the grid of the generator output tube 38 and ground serves to vary the time constants, and therefore the frequency of operation, of the reciproconductive circuit constituting the deflection wave generator 26 for the purpose of synchronizing the deflection sawtooth wave of the television receiver with the deflection waves used in controlling the transmitting equipment from which the program originated. The amplifying tube 48 is coupled to an output transformer 50 to produce a sawtooth current wave in the deflection wave output winding 51 across a portion 52 of which a deflection system winding of two sections 53, 53 are coupled for A.-C. current flow only by means of a blocking capacitor 54. A high voltage winding 56 is also connected to the anode of the amplifying tube 48 and the retrace voltage pulses produced therein are rectified by a high voltage rectifier 58 to produce a high potential across the high voltage capacitor 59 for application through a series resistor 61 to the ultor of the kinescope 18. The wide variations in ultor current drain brought about by the unpredictably changing image lumination is reflected at the terminal 62 of the high voltage winding 66, at the terminal 64 to which the anode of the amplifying tube is connected and in fact all along the transformer winding including the portions 66, 68 and 51, and for that matter in the deflection system winding 53, 53 itself. This disturbance is back-coupled by the grid-to-anode interelectrode capacity of the amplifying tube 58 to the horizontal deflection generator 26, giving rise to the undesired bending. The undesired bending is eliminated according to the invention by coupling a point in the circuitry of the deflection wave amplifying circuit 27 by means of a capacitor 70 to the circuitry common to the output of the deflection wave generating circuit 26 and the input of the deflection wave amplifying circuit 27. In the example shown, one electrode of the compensating pulse coupling capacitor 70 is connected to the grid of the amplifying tube 48 as well as through the series connected capacitor 44 and grid resistor 46 to the anode of the output generating tube 38 and the sawtooth capacitor 41. The other electrode of the compensating pulse coupling capacitor 70 may be connected to a point on the transformer winding 51 or to another and separate winding arranged on the transformer 50 as the disturbance at the terminal 62 will also be present in any winding arranged on the core of the transformer 50. In the example shown a winding 74 having two portions 76, 77 is used to apply reference pulse potential to the phase detector diode 79 for which purpose the junction between the two winding portions 76, 77 is connected to ground for A.-C. by means of a capacitor 81. By the connection shown, a compensating voltage pulse is obtained without adding any taps to the existing circuitry and without adding any winding especially for that purpose, advantage being taken of the windings already existing. The compensating pulse may be obtained from a terminal 82 of an extension 83 of the winding 51 wound in the same direction and connected to the end terminal 72. This arrangement will save wire inasmuch as a portion of the winding 51 is used for two purposes but will be of little advantage in a direct drive system wherein the deflection winding system 53, 53 replaces the output winding portion 52. Essentially in this case the extension winding would be a separate winding so that the arrangement shown is more practical. Where an additional winding is provided for A.-G.-C. keying or A.-F.-C. reference voltages, the pulse may be taken from such winding as shown in Fig. 2.

The compensating coupling capacitor 70 may be adjustable if desired but for practical circuit purposes a fixed capacitor of approximately optimum value will suffice.

In an operating embodiment of the invention, which was wired according to the circuit arrangement shown in Fig. 2, the following component parts values were used.

| Ref. No. | Component | Type or Value |
|---|---|---|
| 33, 34 | Load resistors | 680 ko. |
| 35 | Grid resistor | 2.2 mo. |
| 36 | Grid capacitor | 1,000 mmf. |
| 37, 38 | Generator tubes | 12AU7 |
| 41 | Sawtooth capacitor | 390 mmf. |
| 42 | Sawtooth resistor | 10 ko |
| 44 | Coupling capacitor | 0.01 mf. |
| 46 | Grid resistor | 470 o. |
| 48 | Amplifying tube | 6CD6 |
| 70 | Compensating coupling capacitor | 8 mmf. fixed. |
| 81 | Bypass capacitor | 0.01 mf. |

The compensating coupling capacitor 70 was a 1–10 mmf. variable capacitor which on adjustment provided optimum results at 7.5 mmf., however, a fixed 8 mmf. capacitor of the usual commercial tolerance provided the desired results within commercial operating tolerance.

The invention claimed is:

1. In a television receiver having a deflection circuit including a deflection wave translating tube having a cathode electrode connected to a point of fixed reference potential and grid and anode electrodes, a plurality of deflection windings coupled to the anode-cathode circuit of said tube and at points on which windings there appears with respect to said fixed reference point pulse potentials varying irregularly in amplitude and which adversely affect the quality of deflection wave due to back-coupling by way of the anode-to-grid electrode capacitance of said tube, and a capacitor connected between said grid electrode and a point on one of said windings at which there appears pulse potentials of substantially the same amplitude and of inverse polarity as said pulse potentials, thereby to compensate for variations in quality of said deflection wave.

2. In a television receiver having a deflection circuit including a deflection wave translating tube having a cathode electrode connected to a point of fixed reference potential and grid and anode electrodes, a transformer having a plurality of deflection windings thereon coupled to the anode-cathode circuit of said tube and at points on which windings there appears with respect to said fixed reference point pulse potentials varying irregularly in amplitude and which adversely affect the quality of deflection wave due to back-coupling by way of the anode-to-grid electrode capacitance of said tube, and a capacitor connected between said grid electrode and a point on one of said windings at which there appears pulse potentials of substantially the same amplitude and of inverse polarity as said pulse potentials thereby to compensate for variations in quality of said deflection wave.

3. In a television receiver having a deflection circuit including a deflection wave translating tube having a cathode electrode connected to a point of fixed reference potential and grid and anode electrodes, a transformer having a deflection winding thereon coupled to the anode-cathode circuit of said tube and at points on which winding there appears with respect to said fixed reference point pulse potentials varying irregularly in amplitude and which adversely affects the quality of deflection wave due to back-coupling by way of the anode-to-grid electrode capacitance of said tube, and a capacitor connected between said grid electrode and a point on said winding at which there appears pulse potentials of substantially the same amplitude and of inverse polarity as said pulse potentials, thereby to compensate for variations in quality of said deflection wave.

4. In a television receiver having a deflection circuit including a synchronizing pulse translating circuit, a deflection wave generator having the input circuit connected to said translating circuit and an output circuit, a deflection wave translating tube having a cathode electrode connected to a point of fixed reference potential and a grid electrode coupled to the output circuit of said generator and an anode electrode, a transformer having one deflection wave winding coupled to the anode-cathode circuit of said tube and another winding, at points on which windings there appears with respect to said fixed reference point pulse potentials varying irregularly in amplitude and which adversely affects the quality of deflection wave due to back-coupling, a phase detecting circuit connected to said generator and to said other winding, and a capacitor connected between said grid electrode and a point on said other winding at which there appears pulse potentials of substantially the same amplitude and of inverse polarity as said pulse potentials thereby to compensate for variations in quality of said deflection wave.

5. In a television receiver having a deflection circuit including a deflection wave translating tube having a cathode electrode connected to a point of fixed reference potential and grid and anode electrodes, a transformer having a deflection winding thereon coupled to the anode-cathode circuit of said tube and at points on which winding there appears with respect to said fixed reference point pulse potential varying irregularly in amplitude and which adversely affects the quality of deflection wave due to back coupling by way of the anode-to-grid electrode capacitance of said tube, and a capacitor connected between said grid electrode and a point on said winding at which there appears pulse potential of substantially the same amplitude and of inverse polarity as said back-coupled pulse potential, thereby to compensate for variations in quality of said deflection wave.

6. In a television receiver having a phase detector circuit to which synchronizing pulses are applied, a deflection wave generating circuit coupled to said phase detector circuit to generate sawtooth potential waves in response to said synchronizing pulses, a deflection wave amplifying tube having cathode and control electrodes coupled to said deflection wave generating circuit and an anode electrode, a deflection wave output transformer having a winding coupled to said anode and cathode electrodes and another winding coupled to said phase detector circuit and having a central tap thereon, a capacitor connecting said central tap to said cathode electrode, and a capacitor coupled between one terminal of said other winding and the grid electrode of said amplifying tube.

7. In a television receiver having a deflection wave generating circuit a deflection wave amplifying circuit comprising an amplifying tube having cathode and grid electrodes coupled to said generating circuit and an anode electrode, a transformer having one winding coupled between said anode and cathode electrodes and having another winding, and a capacitor connected between one terminal of said other winding and the grid electrode of said amplifying tube.

8. In a television receiver circuit as defined in claim 7 a galvanic connection between a terminal of said one winding remote from the anode of said tube and the other terminal of said other winding.

References Cited in the file of this patent

UNITED STATES PATENTS 2,664,521 Schlesinger ____________ Dec. 29, 1953